Oct. 17, 1939.　　　H. F. McGOWAN　　　2,176,222
MEASURING DEVICE
Filed April 6, 1938
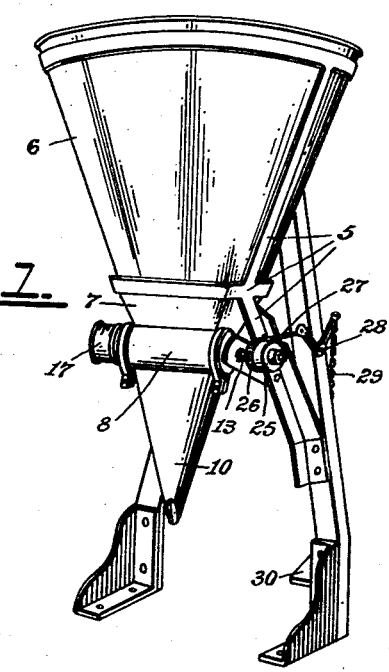
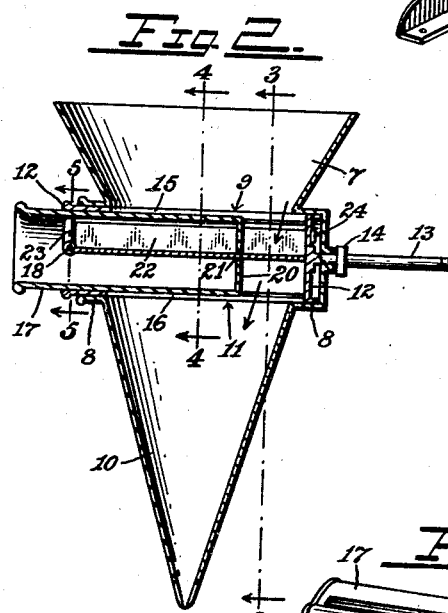
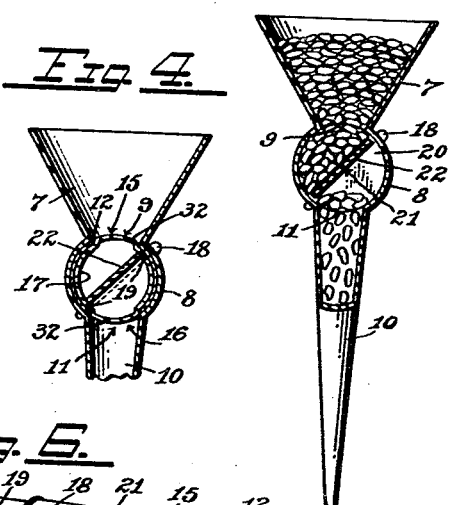
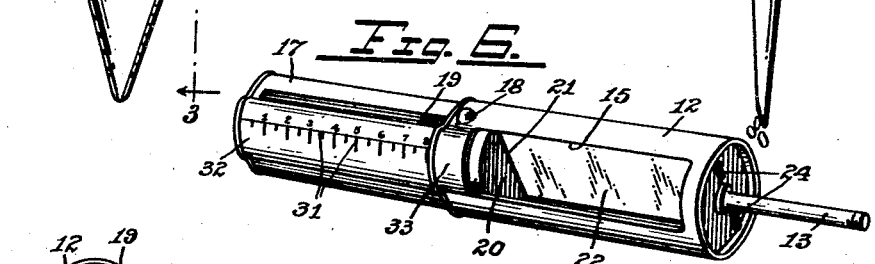
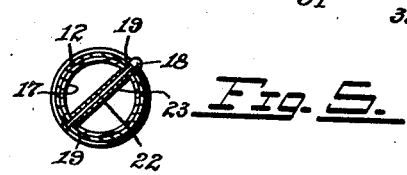
Inventor
Harold F. McGowan
By John W. Maupin
Attorney Patented Oct. 17, 1939

2,176,222

UNITED STATES PATENT OFFICE 2,176,222

MEASURING DEVICE

Harold F. McGowan, Seattle, Wash.

Application April 6, 1938, Serial No. 200,476

2 Claims. (Cl. 221—107)

My invention relates to measuring devices, and more particularly to a device for measuring bulk goods consisting of small uniform particles such as shelled peanuts, coffee, beans and the like. Certain objects of the invention are to provide a measuring device consisting of a cylindrical arrangement that is adapted to make intermittent half revolutions in rapid succession, and which is adapted to automatically and simultaneously fill and empty itself at each half revolution. Further objects are to provide a novel telescopic arrangement of the cylinders whereby the amount of goods that is measured may be increased or decreased at will. Other objects are to provide a measuring device that is close fitting and easy to manipulate, which is simple and economical in construction, and which is accurate and efficient in operation.

In the drawing:

Figure 1 is a view in perspective of the measuring device as a whole;

Fig. 2 is a view in central vertical section of the principal operative portion of the device;

Fig. 3 is a view in transverse vertical section taken substantially on a broken line 3—3 of Fig. 2;

Fig. 4 is a corresponding view taken on a broken line 4—4 of Fig. 2;

Fig. 5 is a detail view in transverse vertical section taken on a broken line 5—5 of Fig. 2; and Fig. 6 is a view in perspective of the measuring and adjusting cylinders cooperatively disposed.

Referring in detail to the drawing wherein like reference numerals indicate like parts in the several views, the numeral 5 designates an upstanding support frame as a whole, and the numeral 6 indicates a conical supply hopper which is supported by said frame. The lower end of said hopper extends snugly into a conical receiver member 7 which may be integral with or fixed to a horizontally disposed casing cylinder 8 and in communication therewith by means of a rectangular opening 9. One end of said casing cylinder is open and its other end is closed. A discharge funnel 10 is integrally or fixedly connected to the lower side of said casing cylinder and is also in communication therewith, as by means of a rectangular opening 11 which is equal to the opening 9 and vertically disposed thereto.

A measuring cylinder 12 fits snugly and revolubly into the casing cylinder 8. One end of said measuring cylinder is closed and fits against the closed end of the casing cylinder, while its other end is open and projects slightly outside the open end of the casing cylinder. A shaft 13 is fixed to the closed end of the measuring cylinder and is journaled through a bearing in the closed end of the casing cylinder. A collar 14 may be connected to said shaft close to said bearing for the purpose of retaining said measuring cylinder in place. A pair of diametrically opposite rectangular openings 15 and 16 are provided in the measuring cylinder, and said openings are equal to and adapted to register with the openings 9 and 11 of the casing cylinder 8.

An adjusting cylinder 17 fits snugly into the measuring cylinder 12. Said adjusting cylinder is adapted to be slidably moved back and forth. A pin 18 extends through the measuring cylinder near its open or outer end and also through diametrically opposite longitudinal slots 19 in said adjusting cylinder whereby it may move back and forth in the measuring cylinder. The outer end of said adjusting cylinder is open and extends beyond the outer end of the measuring cylinder. Its inner end 20 is closed and is provided with a slot 21 disposed in the same plane with the longitudinal slots 19. A partition 22 extends through said slot 21 and through the full length of the measuring cylinder 12, thus dividing said cylinder into two equal longitudinal compartments. Said partition is fixed within the measuring cylinder by bending one of its ends around the pin 18, as at 23, and its other end being shaped into a pair of fingers which project through slots in the closed end of the measuring cylinder, as at 24.

The partition 22, in dividing the measuring cylinder 12 into two equal longitudinal compartments and when in the installed position, is disposed at an angle of substantially forty-five degrees to the right of a plane bisecting the two diametrically opposite rectangular openings 15 and 16, thus placing each of said openings respectively in each of said compartments. When the device is assembled, as shown in Fig. 1, a one-half revolution clutch 25 is fixed to the end of the shaft 13, and the measuring cylinder is initially set in such position that its openings 15 and 16 are vertically disposed with respect to each other and in respective coincidence with the equal openings 9 and 11 thus forming communications between the casing cylinder 8 and the receiver member 7 and discharge funnel 10 respectively. It is thus obvious that the food particles may freely enter the upper one of said compartments and discharge from the corresponding lower compartment at one and the same time.

Again referring to Fig. 1, a sprocket chain 26 may be connected to a sprocket fixed to the clutch 25 with a connecting rod 27 extending to a connection with a bell-crank lever 28 mounted on the frame 5, and a chain 29 may extend down from said lever to a foot-pedal 30 on the floor. Rapid intermittent pressure on said foot-pedal causing the measuring cylinder to make a half revolution at each pressure results in said cylinder simultaneously and successively receiving and discharging the food particles into sacks, cartons or other containers placed under the lower end of the discharge funnel 10. During each half revolution, the upper and lower compartments are closed or cut off by the casing cylinder wall, while the particles in the upper compartment are carried around to the lower or discharging position, and between each half revolution, the upper compartment fills and the lower compartment discharges simultaneously.

In order to increase or decrease the amount of food particles received and discharged by the measuring cylinder 12, it is merely necessary to slidably move the adjusting cylinder 17 inwardly or outwardly as will be apparent from an inspection of Figs. 2 and 6 of the drawing. The measuring cylinder and its partition 22 fixed therein remain stationary, and when the adjusting cylinder is slidably moved, its slots 19 slide along the pin 18, while the slot 21 in its closed end slides along the partition 22 as will be obvious. The amount of particles discharged may be measured and varied in accordance with a graduated scale 31 marked on the adjusting cylinder. In the operation of the device, the measuring and adjusting cylinders, being telescopically fitted together, rotate in unison, alternately bringing the rectangular openings 15 and 16 respectively into coincidence with the openings 9 and 11 of the casing cylinder 8 at each half revolution. In order to prevent the food particles from entering the depression formed by the openings 15 and 16 and resting on the adjusting cylinder where they would be caught and crushed against the edge of the opening 9 at each rotation, I have eliminated such depressions by bulging out opposite portions 32 of the adjusting cylinder 17 and also bulging out opposite end portions 33 of the measuring cylinder 12 in such fashion as to snugly receive the said bulged portions of the adjusting cylinder. These bulged portions of the adjusting cylinder completely fit and fill the depressions formed by the openings 15 and 16 of the measuring cylinder, insofar as said adjusting cylinder is moved inward, and makes said depressions flush with the outer surface of the measuring cylinder 12 and also with the interior surface of the casing cylinder 8 as clearly shown in Fig. 4 of the drawing.

No claim or description in detail is made of the clutch 25 except to specify that same is adapted to make a half revolution at each impulse, as such clutches are standard articles of manufacture. Furthermore, I contemplate the use of a motor, instead of the foot-pedal 30, with an intermittent automatic or other switch for causing half revolutions of the measuring elements. The statement that the partition 22 is inclined to the right of the vertical in the foregoing description applies to a device that is adapted to rotate in a clockwise direction. This inclination would be to the left of the vertical for a device adapted to rotate in a counter-clockwise direction. It will be understood that the accompanying drawing and description are primarily intended as an illustration of means for reducing the principles of the invention to practice, and that such changes therein may be resorted to which do not depart from the scope and spirit of the invention as set forth in the appended claims.

I claim:

1. A measuring device consisting of a casing cylinder having a closed and an open end and equal oppositely disposed openings in its cylindrical wall, a receiving hopper communicating with one of said openings and a discharge funnel communicating with the other opening and having a restricted discharge end, a measuring cylinder revolubly mounted within the casing cylinder and having an open and a closed end and equal oppositely disposed longitudinal openings arranged to respectively coincide with the said openings in the casing cylinder, an inclined partition fixedly dividing the measuring cylinder into two equal longitudinal compartments with one of its openings communicating with one of said compartments and its other opening communicating with its other compartment, an adjusting cylinder having a closed end with a diametrical slot therein, said adjusting cylinder slidably mounted in the measuring cylinder with the slot in its closed end arranged to slidably ride on the inclined partition, and means for revolving the measuring cylinder.

2. A measuring device consisting of a casing cylinder having a closed and an open end and equal oppositely disposed openings in its cylindrical wall, a receiving hopper communicating with one of said openings and a discharge funnel communicating with the other opening, a measuring cylinder revolubly mounted in the casing cylinder and having an open and a closed end and equal oppositely disposed longitudinal openings arranged to respectively coincide with the said openings in the casing cylinder, an inclined partition fixedly dividing the measuring cylinder into two equal longitudinal compartments with one of its openings communicating with one of said compartments and its other opening communicating with its other compartment, an adjusting cylinder having a closed end with a diametrical slot therein, said adjusting cylinder slidably mounted in the measuring cylinder with the slot in its closed end arranged to receive and slidably ride on the inclined partition, said adjusting cylinder having diametrically opposite longitudinal bulging portions arranged to flushly fit the longitudinal openings in the measuring cylinder, said measuring cylinder having opposite bulging portions arranged to receive the bulging portions of the adjusting cylinder, and means for revolving the measuring cylinder.

HAROLD F. McGOWAN.